(12) United States Patent
Taylor et al.

(10) Patent No.: US 10,120,369 B2
(45) Date of Patent: Nov. 6, 2018

(54) CONTROLLING A DIGGING ATTACHMENT ALONG A PATH OR TRAJECTORY

(71) Applicant: Harnischfeger Technologies, Inc., Wilmington, DE (US)

(72) Inventors: Wesley P. Taylor, Glendale, WI (US); Brian J. Slaboch, Milwaukee, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 698 days.

(21) Appl. No.: 14/590,730

(22) Filed: Jan. 6, 2015

(65) Prior Publication Data

US 2016/0195871 A1 Jul. 7, 2016

(51) Int. Cl.
*G05B 19/4103* (2006.01)
*G05B 19/402* (2006.01)

(52) U.S. Cl.
CPC ....... *G05B 19/4103* (2013.01); *G05B 19/402* (2013.01); *G05B 2219/36342* (2013.01); *G05B 2219/39573* (2013.01)

(58) Field of Classification Search
CPC ... B25J 9/1664; G05B 19/4103; G05B 19/402
See application file for complete search history.

(56) References Cited

U.S. PATENT DOCUMENTS

| | | | |
|---|---|---|---|
| 5,752,333 A | 5/1998 | Nakagawa et al. | |
| 5,835,874 A | 11/1998 | Hirata et al. | |
| 5,960,378 A | 9/1999 | Watanabe et al. | |
| 5,974,352 A | 10/1999 | Shull | |
| 6,025,686 A | 2/2000 | Wickert et al. | |
| 6,098,322 A | 8/2000 | Tozawa et al. | |
| 6,101,437 A | 8/2000 | Oshina et al. | |
| 7,007,415 B2 | 3/2006 | Koch | |
| 7,516,563 B2 | 4/2009 | Koch | |
| 7,539,570 B2 | 5/2009 | Normann | |
| 7,810,260 B2 | 10/2010 | Pope et al. | |
| 7,949,449 B2 | 5/2011 | Koch et al. | |
| 8,065,037 B2 | 11/2011 | Danko | |

(Continued)

FOREIGN PATENT DOCUMENTS

| | | |
|---|---|---|
| JP | S6286235 | 4/1987 |
| JP | 2002/167794 | 6/2002 |

*Primary Examiner* — Mohammad Ali
*Assistant Examiner* — Vincent Chang
(74) *Attorney, Agent, or Firm* — Michael Best & Friedrich LLP

(57) ABSTRACT

A industrial machine including a component, one or more actuators configured to control the component, an input device configured to generate a first signal corresponding to a first desired motion and a second signal corresponding to a second desired motion, and a controller. The controller is configured to receive the first signal, determine a first target vector, determine a first set of control signals, the first set of control signals related to the first desired motion, and provide the first set of control signals to the one or more actuators. The controller is also configured to receive the second signal, determine a second target vector, determine a second set of control signals based on the first target vector and the second target vector, the second set of control signals related to the second desired motion, and provide the second set of control signals to the one or more actuators.

18 Claims, 7 Drawing Sheets

(56) References Cited

U.S. PATENT DOCUMENTS

| | | |
|---|---|---|
| 8,145,394 B2 | 3/2012 | Chiorean et al. |
| 8,261,471 B2 | 9/2012 | Hall et al. |
| 8,515,708 B2 | 8/2013 | McAree et al. |
| 8,571,762 B2 | 10/2013 | McAree et al. |
| 8,571,766 B2 | 10/2013 | Colwell et al. |
| 8,577,564 B2 | 11/2013 | Stanek |
| 2012/0165962 A1 | 6/2012 | Faivre |
| 2012/0232763 A1 | 9/2012 | Mizuochi et al. |
| 2013/0245897 A1 | 9/2013 | Linstroth et al. |
| 2014/0107841 A1* | 4/2014 | Danko .................. B25J 9/1607 700/253 |

* cited by examiner

CONTROLLING A DIGGING ATTACHMENT ALONG A PATH OR TRAJECTORY

BACKGROUND

The present invention relates to controlling a digging attachment along a path or trajectory.

SUMMARY

Industrial machines, such as electric mining shovel machines, are controlled by an operator who commands a motion reference to the "joints" of the industrial machine. Hoist actuators, crowd actuators, and swing actuators can be considered the primary moving "joints" of the industrial machine. In order to achieve a specific path or trajectory of movement of a component of the industrial machine (e.g., an end effector or digging attachment of the industrial machine such as a dipper, dipper lip, etc.), the operator must apply specific and accurate commands to the joints. Accurately and precisely completing some motions, such as holding a horizontal line, is very difficult for an operator. For example, the more accurate the digging attachment of the industrial machine is to be controlled, the more difficult it is for an operator to provide the necessary input commands to achieve position and velocity targets for the desired path or trajectory.

Applications such as manufacturing robots, for example, utilize oversized motors which allow for precise position and velocity control of a robotic arm. Such an approach cannot be used with industrial machines where the motor capabilities do not have the same type of overhead and scaled control authority (e.g., motor size versus machine size). As a result, the types of control schemes utilized by manufacturing robots do not translate to and cannot be used with industrial machines (e.g., electric mining shovels, draglines, etc.).

This invention provides a control system and method that can accurately and precisely control a component or end effector of an industrial machine. The control system is capable of handling the large inertia of the industrial machine, position creep of the component, and speed and torque limitations of the industrial machines actuation devices (e.g., motors, hydraulics, etc.). The invention converts operator inputs (e.g., via joysticks) into a path or trajectory target. A target vector is generated or updated and a controller positions the end effector on the target vector while maintaining the speed and accuracy of the motion. The controller translates operator commands into a different form (e.g., Z axis speed, X axis speed, etc.), calculates a desired path or trajectory, updates the target vector, and controls the component of the industrial machine along the calculated path while compensating for, among other things, position creep, resistance, new operator commands, etc. By updating the target vector, rather than calculating a new target vector for each operator input, precise position and velocity control for the component or end effector of the industrial machine can be achieved in the absence of oversized motors (i.e., as are used in the significantly smaller robotic applications).

In one embodiment, the invention provides a method of controlling a motion of a component of an industrial machine. The method includes receiving, from an input device, a first signal corresponding to a first desired motion of the component, determining, with a controller, a first target vector based on the first signal, determining, with the controller, a first set of control signals based on the first target vector, the first set of control signals related to the first desired motion of the component, and providing the first set of control signals to one or more actuators to control the component of the industrial machine based on the first target vector. The method also includes receiving, from the input device, a second signal corresponding to a second desired motion of the component, determining, with the controller, a second target vector based on the second signal, determining, with the controller, a second set of control signals based on the first target vector and the second target vector, the second set of control signals related to the second desired motion of the component, and providing the second set of control signals to the one or more actuators to control the component of the industrial machine based on the second target vector.

In another embodiment, the invention provides an industrial machine. The industrial machine includes a component, one or more actuators configured to control the component, an input device configured to generate a first signal corresponding to a first desired motion of the component and a second signal corresponding to a second desired motion of the component, and a controller including a processor and a memory. The controller is configured to receive the first signal, determine a first target vector based on the first signal, determine a first set of control signals based on the first target vector, the first set of control signals related to the first desired motion of the component, and provide the first set of control signals to the one or more actuators to control the component of the industrial machine based on the first target vector. The controller is also configured to receive the second signal, determine a second target vector based on the second signal, determine a second set of control signals based on the first target vector and the second target vector, the second set of control signals related to the second desired motion of the component, and provide the second set of control signals to the one or more actuators to control the component of the industrial machine based on the second target vector.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Other aspects of the invention will become apparent by consideration of the detailed description and accompanying drawings.

DETAILED DESCRIPTION

The invention described herein relates to controlling the motion of a component or end point of an industrial machine. Unlike control techniques that use operator commands to command joint (e.g., hoist, crowd, swing) velocities to user specified values, the invention uses operator commands to generate a target velocity vector for the component or end point of the industrial machine. The operator input values are converted to a target velocity vector for the component or end point of the industrial machine. The target velocity vector is used to generate drive values or velocities for the joints such that the drive values or velocities for the joints are mapped to achieve the desired velocity vector of the component or end point. Upon receiving a subsequent command from the operator, the previous target velocity vector is updated based on the new command from the operator. As such, the target velocity vector of the component or end point is a persistent vector that is continually updated based on the commands from the operator. Such a technique improves the ability to accurately control the motion of the component or end point of the industrial machine along a desired path or trajectory.

Figure 1:
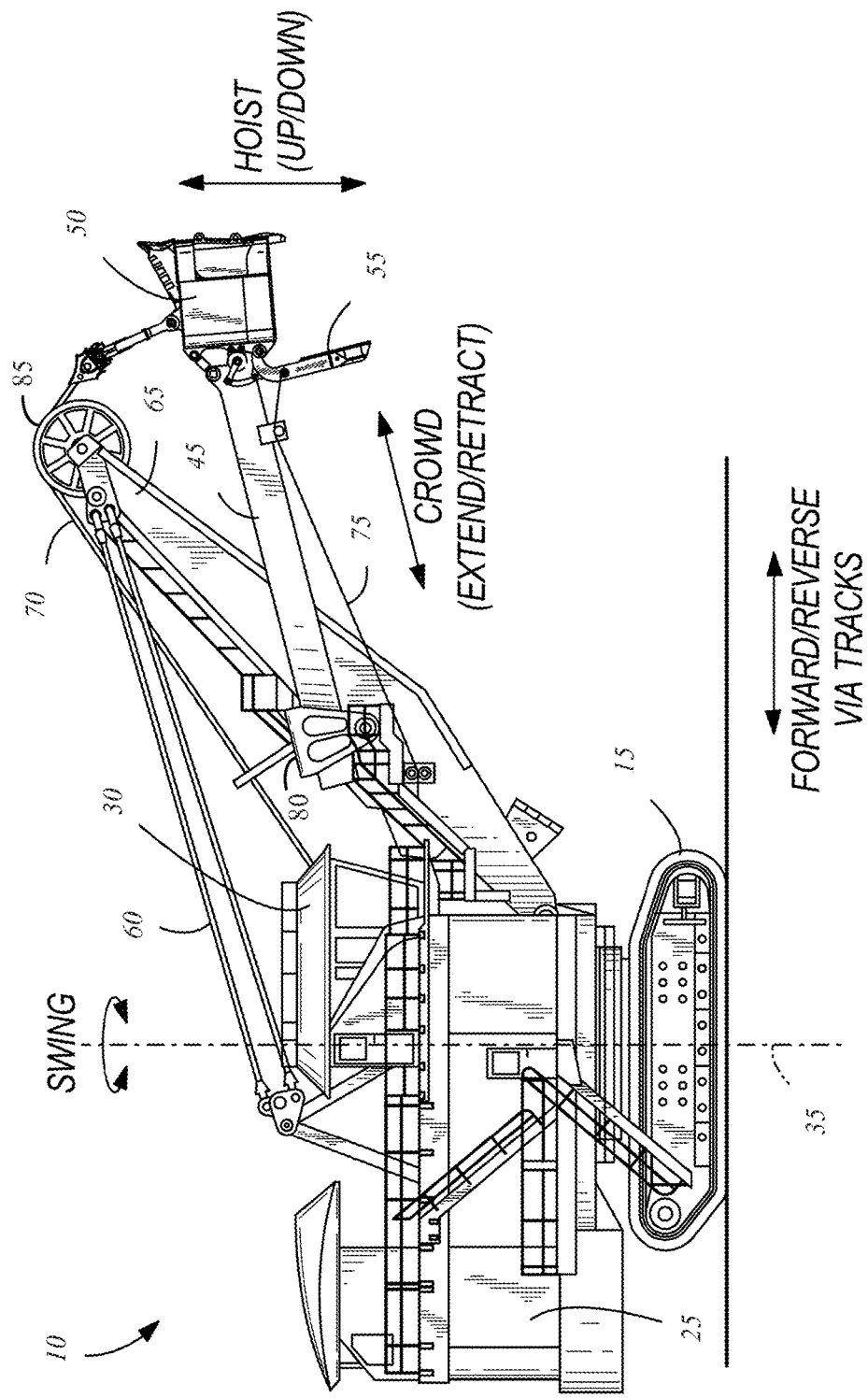
FIG. 1 illustrates an industrial machine according to an embodiment of the invention.

Although the invention described herein can be applied to, performed by, or used in conjunction with a variety of industrial machines (e.g., a rope shovel, a dragline, AC machines, DC machines, hydraulic machines, etc.), embodiments of the invention described herein are described with respect to an electric rope or power shovel, such as the power shovel 10 shown in FIG. 1. The industrial machine 10 includes tracks 15 for propelling the industrial machine 10 forward and backward, and for turning the industrial machine 10 (i.e., by varying the speed and/or direction of left and right tracks relative to each other). The tracks 15 support a base 25 including a cab 30. The base 25 is able to swing or swivel about a swing axis 35, for instance, to move from a digging location to a dumping location. Movement of the tracks 15 is not necessary for the swing motion. The industrial machine 10 further includes a pivotable dipper handle 45 and dipper 50. The dipper 50 includes a door 55 for dumping the contents of the dipper 50.

The industrial machine 10 includes suspension cables 60 coupled between the base 25 and a boom 65 for supporting the boom 65. The industrial machine also includes a wire rope or hoist cable 70 attached to a winch and hoist drum (not shown) within the base 25 for winding the hoist cable 70 to raise and lower the dipper 50, and a crowd cable 75 connected between another winch (not shown) and the dipper door 55. The industrial machine 10 also includes a saddle block 80, a sheave 85, and gantry structures 90. In some embodiments, the industrial machine 10 is a P&H® 4100 series shovel produced by P&H Mining Equipment Inc.

Figure 2:
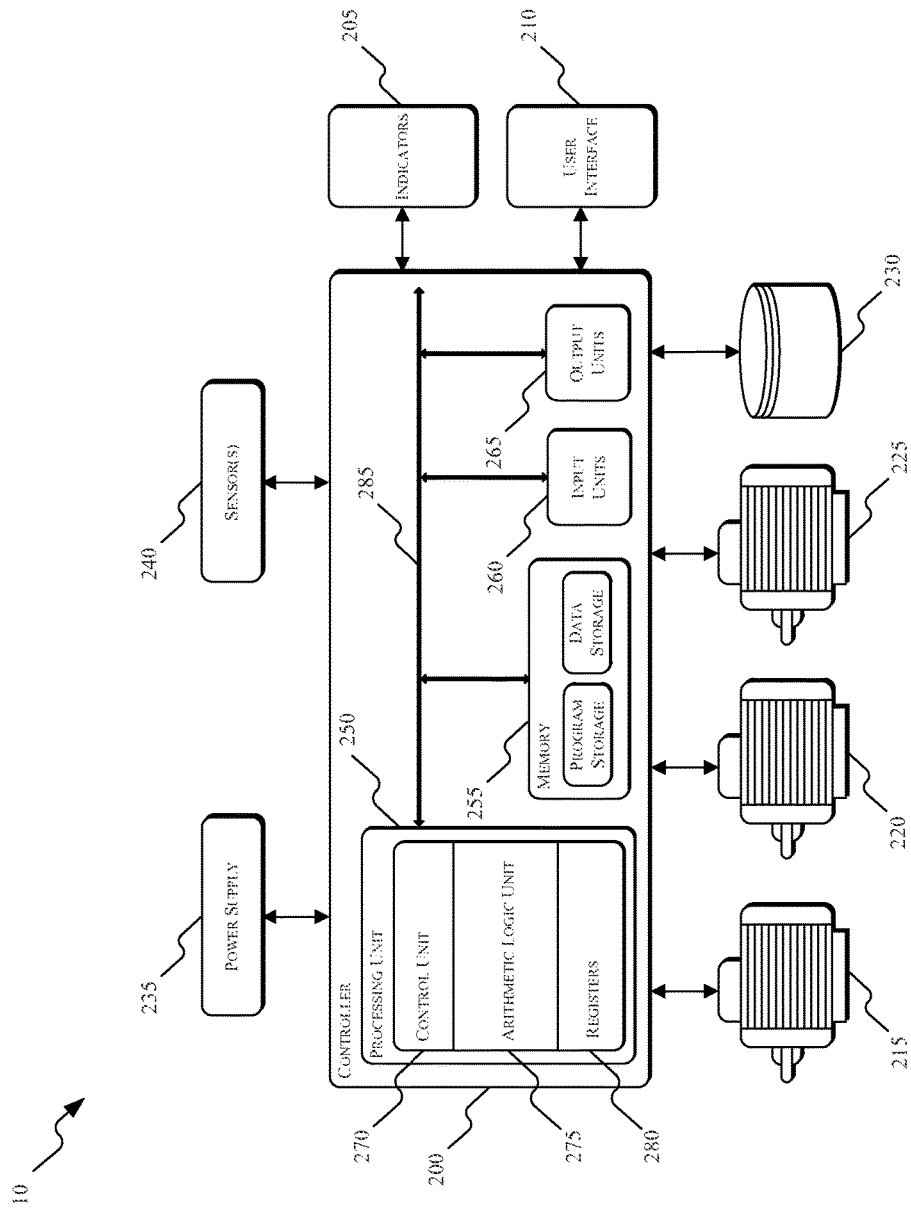
FIG. 2 illustrates a control system of the industrial machine of FIG. 1 according to an embodiment of the invention.

FIG. 2 illustrates a controller 200 associated with the industrial machine 10 of FIG. 1. The controller 200 is electrically and/or communicatively connected to a variety of modules or components of the industrial machine 10. For example, the illustrated controller 200 is connected to one or more indicators 205, a user interface module 210, one or more hoist actuation devices (e.g., motors, hydraulic cylinders, etc.) and hoist drives 215, one or more crowd actuation devices (e.g., motors, hydraulic cylinders, etc.) and crowd drives 220, one or more swing actuation devices (e.g., motors, hydraulic cylinders, etc.) and swing drives 225, a data store or database 230, a power supply module 235, and one or more sensors 240. The controller 200 includes combinations of hardware and software that are operable to, among other things, control the operation of the industrial machine 10, control the position of the boom 65, the dipper handle 45, the dipper 50, etc., activate the one or more indicators 205 (e.g., a liquid crystal display ["LCD"]), monitor the operation of the industrial machine 10, etc. The one or more sensors 240 include, among other things, a loadpin, a strain gauge, one or more inclinometers, gantry pins, one or more motor field modules (e.g., measuring motor parameters such as current, voltage, power, etc.), one or more rope tension sensors, one or more resolvers, etc. In some embodiments, a crowd drive other than a crowd motor drive can be used (e.g., a crowd drive for a single legged handle, a stick, a hydraulic cylinder, etc.).

In some embodiments, the controller 200 includes a plurality of electrical and electronic components that provide power, operational control, and protection to the components and modules within the controller 200 and/or industrial machine 10. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture, such as a modified Harvard architecture, a von Neumann architecture, etc. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the industrial machine 10 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The power supply module 235 supplies a nominal AC or DC voltage to the controller 200 or other components or modules of the industrial machine 10. The power supply module 235 is powered by, for example, a power source having nominal line voltages between 100V and 240V AC and frequencies of approximately 50-60 Hz. The power supply module 235 is also configured to supply lower voltages to operate circuits and components within the controller 200 or industrial machine 10. In other constructions, the controller 200 or other components and modules within the industrial machine 10 are powered by one or more batteries or battery packs, or another grid-independent power source (e.g., a generator, a solar panel, etc.).

The user interface module 210 is used to control or monitor the industrial machine 10. For example, the user interface module 210 is operably coupled to the controller 200 to control the position of the dipper 50, the position of the boom 65, the position of the dipper handle 45, etc. The user interface module 210 includes a combination of digital and analog input or output devices required to achieve a desired level of control and monitoring for the industrial machine 10. For example, the user interface module 210 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface module 210 can also be configured to display conditions or data associated with the industrial machine 10 in real-time or substantially real-time. For example, the user interface module 210 is configured to display measured electrical characteristics of the industrial machine 10, the status of the industrial machine 10, the position of the dipper 50, the position of the dipper handle 45, etc. In some implementations, the user interface module 210 is controlled in conjunction with the one or more indicators 205 (e.g., LEDs, speakers, etc.) to provide visual or auditory indications of the status or conditions of the industrial machine 10.

Figure 3:
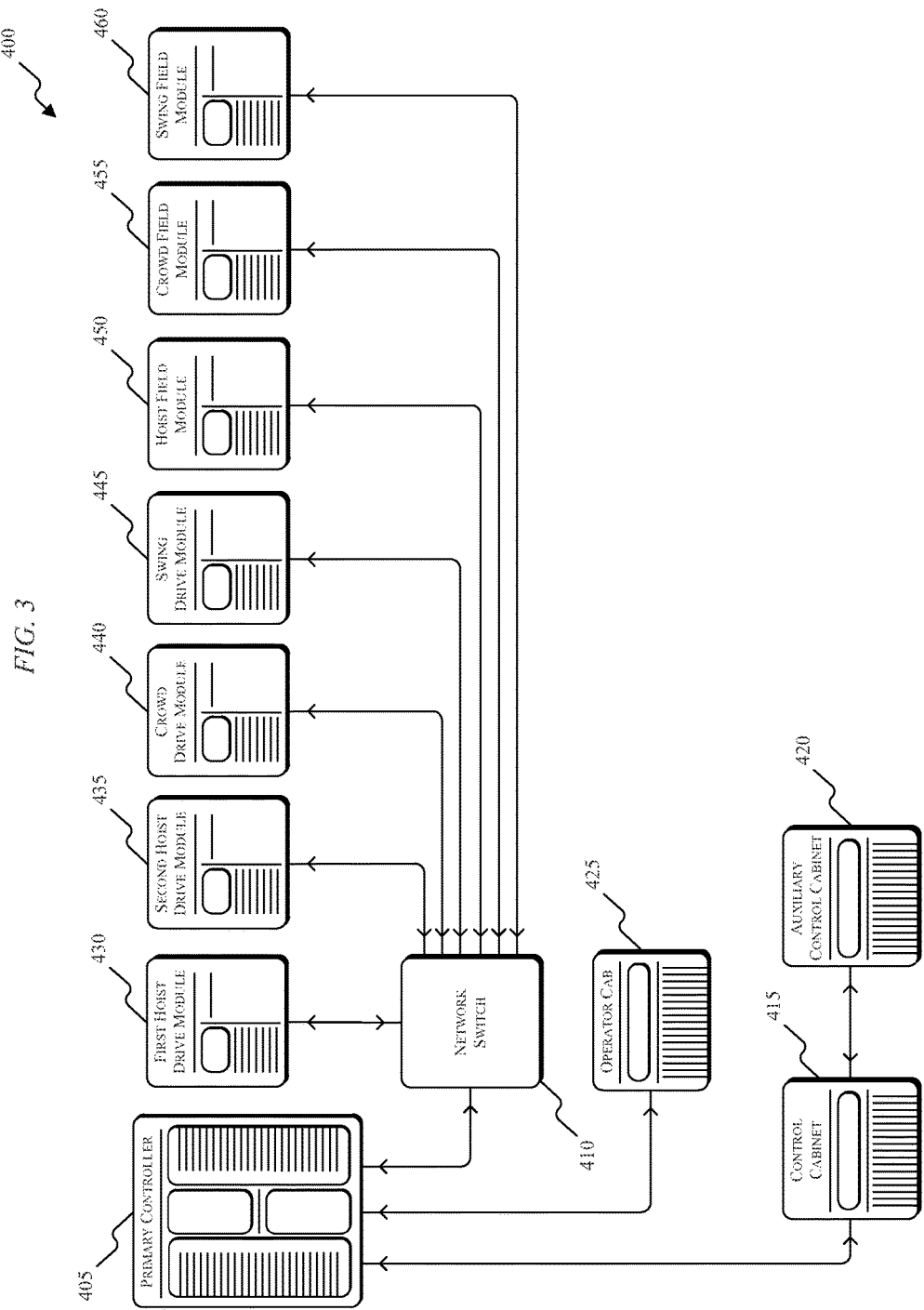
FIG. 3 illustrates a control system of the industrial machine of FIG. 1 according to another embodiment of the invention.

FIG. 3 illustrates a more detailed control system 400 for the industrial machine 10. For example, the industrial machine 10 includes a primary controller 405, a network switch 410, a control cabinet 415, an auxiliary control cabinet 420, an operator cab 425, a first hoist drive module 430, a second hoist drive module 435, a crowd drive module 440, a swing drive module 445, a hoist field module 450, a crowd field module 455, and a swing field module 460. The various components of the control system 400 are connected by and communicate through, for example, a fiber-optic communication system utilizing one or more network protocols for industrial automation, such as process field bus ("PROFIBUS"), Ethernet, ControlNet, Foundation Fieldbus, INTERBUS, controller-area network ("CAN") bus, etc. The control system 400 can include the components and modules described above with respect to FIG. 2. For example, the one or more hoist actuation devices and/or drives 215 correspond to first and second hoist drive modules 430 and 435, the one or more crowd actuation devices and/or drives 220 correspond to the crowd drive module 440, and the one or more swing actuation devices and/or drives 225 correspond to the swing drive module 445. The user interface 210 and the indicators 205 can be included in the operator cab 425, etc. A strain gauge, an inclinometer, gantry pins, resolvers, etc., can provide electrical signals to the primary controller 405, the controller cabinet 415, the auxiliary cabinet 420, etc.

The first hoist drive module 430, the second hoist drive module 435, the crowd drive module 440, and the swing drive module 445 are configured to receive control signals from, for example, the primary controller 405 to control hoisting, crowding, and swinging operations of the industrial machine 10. The control signals are associated with drive signals for hoist, crowd, and swing actuation devices 215, 220, and 225 of the industrial machine 10. As the drive signals are applied to the actuation devices 215, 220, and 225, the outputs (e.g., electrical and mechanical outputs) of the actuation devices are monitored and fed back to the primary controller 405 (e.g., via the field modules 450-460). The outputs of the actuation devices include, for example, positions, speeds, torques, powers, currents, pressures, etc. Based on these and other signals associated with the industrial machine 10, the primary controller 405 is configured to determine or calculate one or more operational states or positions of the industrial machine 10 or its components. In some embodiments, the primary controller 405 determines a dipper position, a dipper handle angle or position, dipper load, a hoist rope wrap angle, a hoist speed, a number of dead wraps, a crowd speed, a dipper speed, swing speed, a dipper acceleration, a CG excursion (e.g., with respect to axis 35), a tipping moment, total gantry load (e.g., total gantry structural loading), etc.

The controller 200/405 is configured to execute velocity and position control of the component or end-point of the industrial machine 10 based on operator specified inputs (e.g., joint velocity inputs). User inputs or commands are input to the controller 200/405 using, for example, a joystick or another input device as described above. The inputs from the user are converted to percentages for a desired motion (e.g., hoist motions, crowd motions, swing motions, etc.). The inputs are then converted into a global motion command (e.g., X axis commands, Z axis commands, a desired vector, etc.) based on the configuration and/or state or status of the industrial machine. For example, differential velocity kinematics can be used by the controller 200/405 to achieve coordinated joint motion and to correct for position errors of the component or end point of the industrial machine 10.

Figure 4:
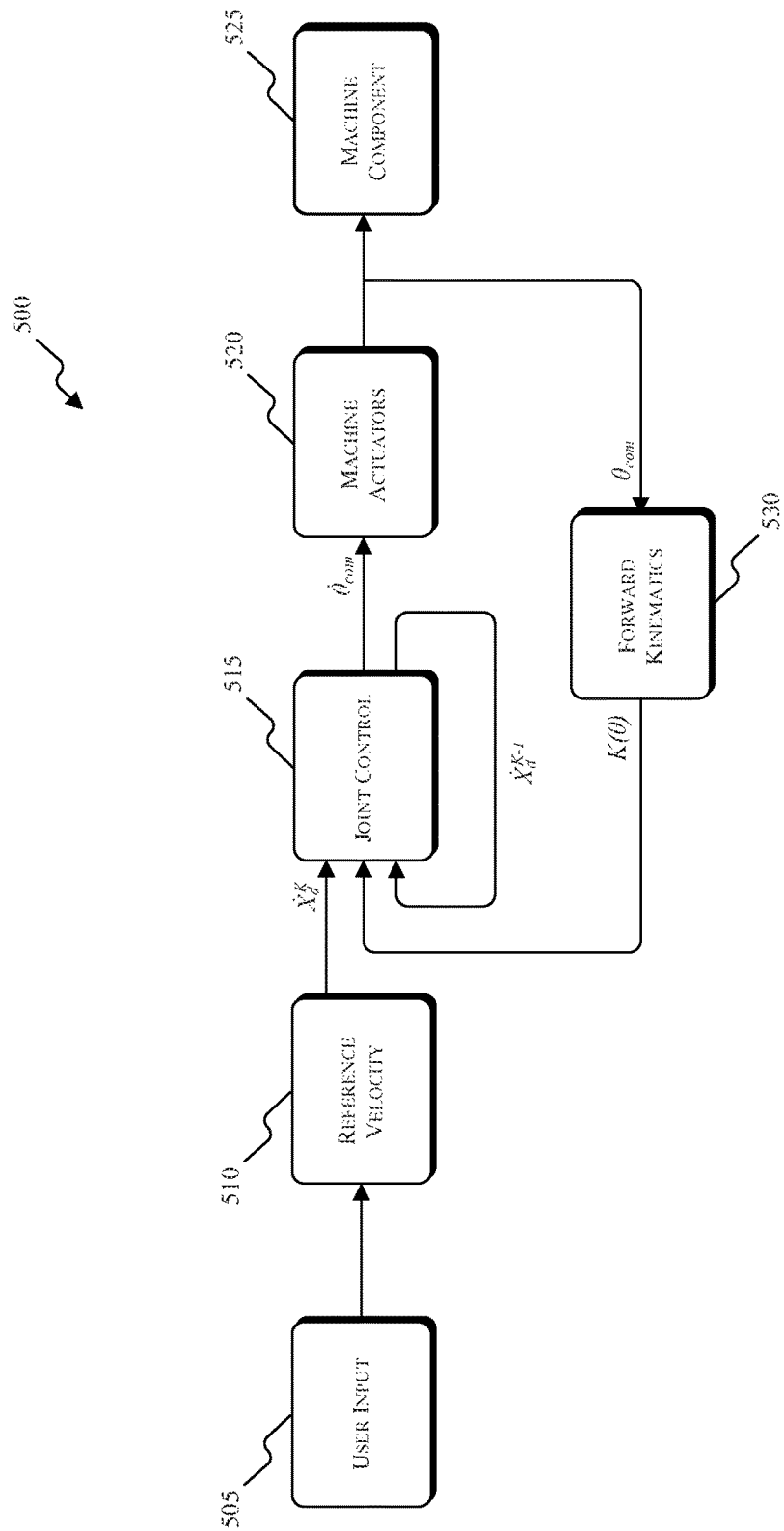
FIG. 4 illustrates a vector control system according to an embodiment of the invention.

A control architecture 500 for the industrial machine 10 is illustrated as a functional block diagram in FIG. 4. A user input module 505 receives an input from a user (e.g., a joystick, etc.). The user input module 505 provides a signal related to the user input (e.g., joystick %) to a reference velocity module 510. The user input is converted to one or more reference velocity vectors, $\dot{X}_d^k$, by the reference velocity module 510. For example, the industrial machine can perform different conversions based on the mode of operation of the industrial machine. The conversions can correspond to, for example, a Cartesian mode, a horizontal path mode, a programmed path mode, etc., that generate a desired velocity vector, $\dot{X}_d^k$ (i.e., a desired velocity vector in a coordinate frame such as a polar coordinate frame, cylindrical coordinate frame [i.e., $R_1 Z_1 \theta_1$], etc., at time step k).

In the Cartesian mode, a hoist joystick input is multiplied by a maximum speed along a vertical axis (e.g., Z axis) according to EQN. 1:

Z axis [m/s]=Max axis speed [m/s]*Hoist joystick [%]     EQN. 1

A crowd joystick input is multiplied by a maximum speed along a horizontal axis (e.g., X axis) according to EQN. 2:

X axis[m/s]=Max axis speed[m/s]*Crowd joystick [%]     EQN. 2

In a horizontal path mode, a hoist joystick input is multiplied by a maximum speed along a horizontal axis (e.g., X axis) according to EQN. 3:

Horizontal Speed[m/s]=Max axis speed[m/s]*Hoist joystick[%]     EQN. 3

A crowd joystick input is multiplied by a maximum path deviation along the horizontal axis according to EQN. 4:

Deviation angle[°]=0[°]+max path deviation[m]*crowd joystick[%]     EQN. 4

In a programmed path mode, a hoist joystick input is multiplied by a maximum speed along an axis (e.g., Z axis) according to EQN. 5:

Speed on Path[m/s]=Max axis speed[m/s]*hoist joystick[%]     EQN. 5

A crowd joystick input is multiplied by a maximum path deviation along the horizontal axis according to EQN. 4:

Path deviation[m]=0[m]+max path deviation[m]*crowd joystick[%]     EQN. 6

Each mode provides enough information in combination with machine feedback parameters or characteristics, such as current dipper position and other forward kinematic parameters, to determine or calculate output velocity targets (e.g., X axis [m/s] and Z axis [m/s] velocity targets).

A joint control module 515 receives the velocity vector, $\dot{X}_d^k$, as well as a desired velocity vector, $\dot{X}_d^{k-1}$, and forward kinematic parameters, $K(\theta)$. $\dot{X}_d^{k-1}$ is a desired velocity vector in the coordinate frame at time step k−1. The joint control module 515 outputs a vector of commanded angular velocities or joint velocity commands, $\dot{\theta}_{com}$, which are provided to a machine actuators module 520 as well as the joint control module 515 as a feedback signal. The machine actuators module 520 corresponds to, or provides signals to, for example, the one or more hoist actuation devices and hoist drives 215, the one or more crowd actuation devices and crowd drives 220, and the one or more swing actuation devices and swing drives 225. The output(s) of the machine actuators module 520 are configured to or operable for controlling the operation of the machine component 525 (e.g., the dipper 50, etc.) using the actuators and drives 215, 220, and 225. The output of the machine actuators module 520 is also provided to a forward kinematics module 530 as a current vector of machine kinematic configurations, $\theta_{com}$. The forward kinematics module 530 outputs the forward kinematic parameters, $K(\theta)$, to the joint control module 515.

Figure 5:
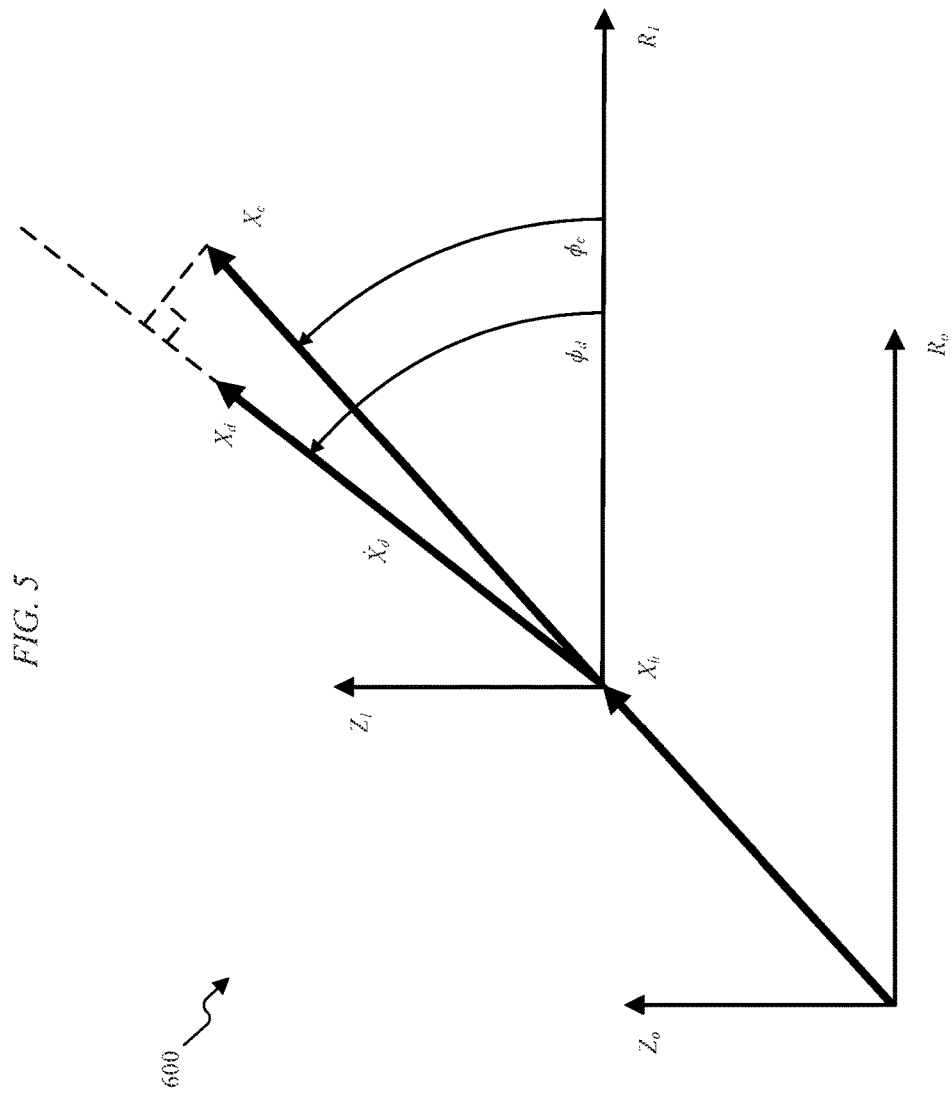
FIG. 5 illustrates vector control according to an embodiment of the invention.

The velocity vectors generated by the reference velocity module 510 and provided to the joint control module 515 are graphically illustrated in FIG. 5 within, for example, an $R_x Z_x \theta_x$ cylindrical coordinate system 600. The user inputs (e.g., joystick commands) are used to specify the components of the desired velocity vector, $\dot{X}_d^k$, in the coordinate system 600. $R_o$ and $Z_o$ are axes of the coordinate system at time interval k=0. $R_1$ and $Z_1$ are axes for the coordinate system at time interval k=1. With reference to FIG. 5, $X_h$ is a home position vector for a position correction function (e.g., an inverse Jacobian function) relative to a fixed $R_0 Z_0 \theta_0$ coordinate frame. $\dot{X}_d$ represents the components of desired velocity in the $R_1 Z_1 \theta_1$ coordinate frame. $X_d$ is a desired position vector in the $R_1 Z_1 \theta_1$ coordinate frame. $X_c$ is a current position vector in the $R_1 Z_1 \theta_1$ coordinate frame. $\emptyset_c$ is a current angular direction, and $\emptyset_d$ is a desired angular direction.

A target vector for the industrial machine 10 is a persistent vector that is based, in some embodiments, in the Cartesian space (e.g., X and Y coordinates) of the industrial machine. Each operator input is evaluated and is used to adjust an aspect of the target vector. By utilizing a persistent vector, the stability and control response of the system is improved over generating a completely new target vector for each processor update from the operator commands. In some embodiments, the vector target updates are smoothed via rate limiters and based on the direction and magnitude of the target vector to prevent control jerk or unstable motion commands. In some embodiments, the industrial machine's motions can also be controlled as objective functions, such as a "drop cut" or "flat front" using the control architecture 500. In some embodiments, the controller identifies or receives an indication of what motion the operator is attempting to perform (e.g., drop cut, flat floor, selective digging).

Figure 6:
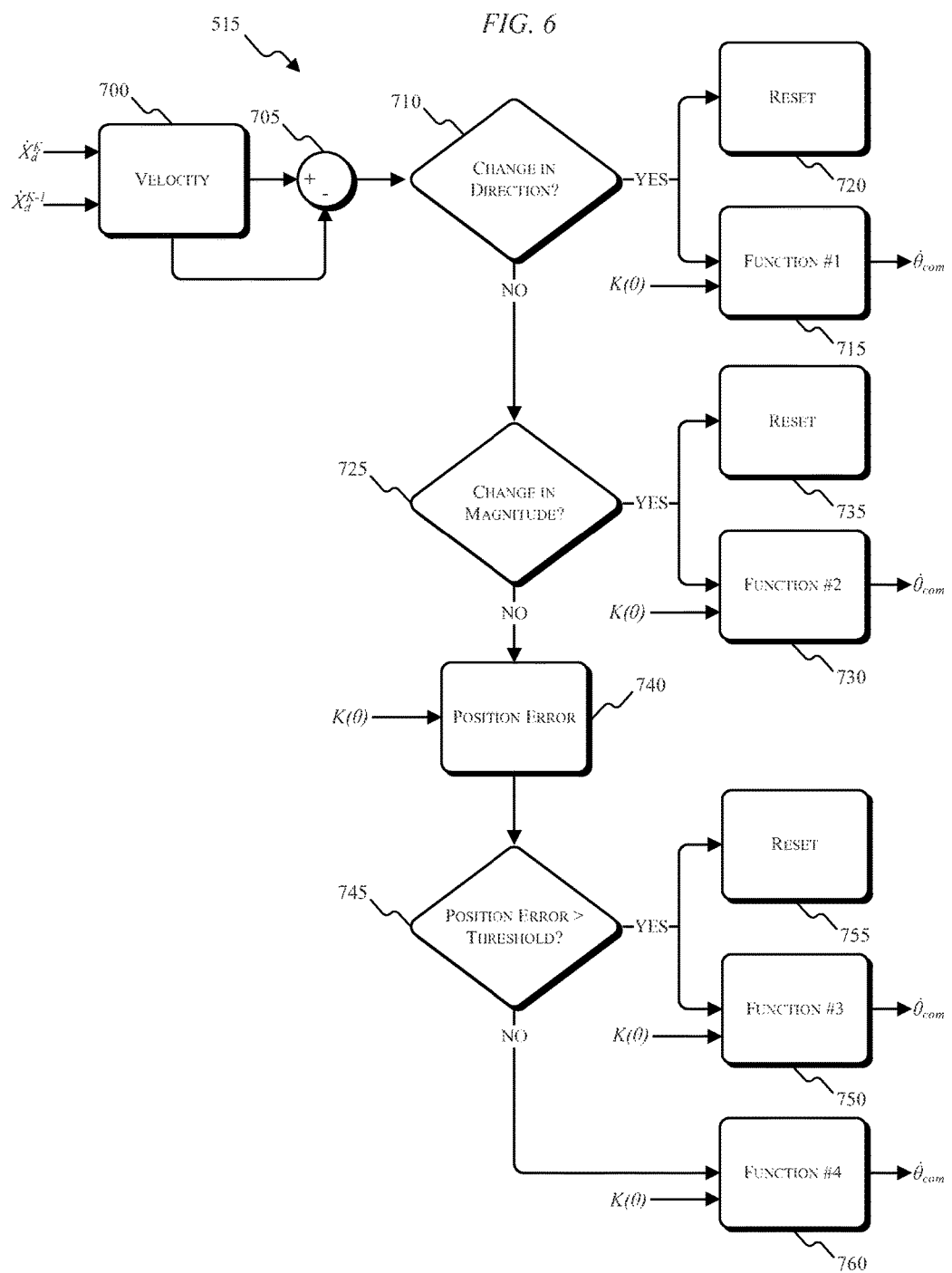
FIG. 6 illustrates a joint control module according to an embodiment of the invention.

The joint control module 515 is illustrated in more detail in FIG. 6. In some embodiments, the joint control module 515 provides for hoist controls, crowd controls, swing controls, and tilt motion controls. The desired velocity direction, $\emptyset_d$, and the velocity magnitude, $|\dot{X}_d|$, of desired velocity vector, $\dot{X}_d$, are input to a velocity module 700 for the current time step, k, and the previous time step, k−1, to update the desired velocity vector or target vector. A difference between the updated desired velocity vector for the current time step, k, and the previous time step, k−1, is determined at a summation module 705.

After the difference between the two velocities is determined, the joint control module 515 responds in one of four ways. Specifically, the joint control module 515 responds to (1) a change in direction only; (2) a change in magnitude only; (3) no change in magnitude or direction (position error); and (4) no change in magnitude or direction (no position error). The manner in which the joint control module 515 responds to control the component of the industrial machine depends on the current position of the end-point as well as the direction and magnitude of the desired velocity command (i.e., the vector of commanded angular velocities, $\dot{\theta}_{com}$).

The joint control module 515 first checks for a change in the direction of the velocity command at a change in direction module 710. A change in the velocity direction specifies a new straight line path the operator wishes to follow. If a change in direction is detected, the current forward kinematics data, $K(\theta)$, is used as an input to a first function 715 (e.g., an inverse Jacobian function). The first function 715 specifies a mapping of machine actuator velocities to end-point velocities. An exemplary relationship between the desired velocity vector, $\dot{X}_d$, and vector of commanded angular velocities, $\dot{\theta}_{com}$, or joint velocity commands is given in EQN. 7.

$$\dot{\theta}_{com} = J^{-1}(\dot{X}_d) \qquad \text{EQN. 7}$$

The output joint velocity commands, $\dot{\theta}_{com}$, are then provided to the machine actuators 215, 220, and 225. The home position, $X_h$, of the end point and path time, $\Delta_t$, are reset at a reset module 720 according to EQNS. 8 and 9:

$$X_h = X_h + X_c \qquad \text{EQN. 8}$$

and $$\Delta_t = 0 \qquad \text{EQN. 9}$$

where, $\Delta_t$, is the amount of time spent moving on the desired path (i.e., path time). The home position and path time are used as the base position to correct for disturbances in end-point position.

If, at module 710, the commanded direction remains constant (i.e., substantially unchanged), the joint control module 515 determines if there has been a change in magnitude of the desired velocity vector, $\dot{X}_d$, at a change in magnitude module 725. If a change in magnitude is detected, the current forward kinematics data, $K(\theta)$, is used as an input to a second function 730 (e.g., an inverse Jacobian function) which corrects for position. An exemplary position correction function with a magnitude change is given by EQN. 10:

$$\dot{\theta}_{com} = J^{-1}(\dot{X}_d + K(X_d - X_c)) \qquad \text{EQN. 10}$$

The path time and home position are then reset in a reset module 735 according to EQNS. 11 and 12:

$$X_h = X_h + |X_c|\cos(\phi_d - \phi_c)\begin{bmatrix} \cos\phi_d \\ \sin\phi_d \end{bmatrix} \qquad \text{EQN. 11}$$

and $$\Delta_t = 0 \qquad \text{EQN. 12}$$

If the commanded direction and magnitude have remained constant, the joint control system determines the end-point position error, e, at a position error module 740 using the current forward kinematics data, $K(\theta)$. End-point position error is given by EQN. 13:

$$e = \sqrt{(X_d^z - X_c^z)^2 + (X_d^R - X_c^R)^2} > e_{threshold} \qquad \text{EQN. 13}$$

Where $X_d^z$ is a desired position in the Z direction of the coordinate system, $X_c^z$ is a current position in the Z direction of the coordinate system, $X_d^R$ is a desired position in the R direction of the coordinate system, $X_c^R$ is a current position in the R direction of the coordinate system, and $e_{threshold}$ is a threshold end-point position error value.

If the position error is greater than the threshold end-point position error value at 745, the output joint velocity commands, $\dot{\theta}_{com}$, are determined using the forward kinematics data, $K(\theta)$, as an input to a third function 750 (e.g., an inverse Jacobian function) as provided in an exemplary manner in EQN. 14:

$$\dot{\theta}_{com} = J^{-1}(\dot{X}_d) \qquad \text{EQN. 14}$$

The home position and error are reset in a reset module 755 according to EQNS. 15 and 16:

$$X_h = X_h + X_c \qquad \text{EQN. 15}$$

and $$\Delta_t = 0 \qquad \text{EQN. 16}$$

If the position error is less than or equal to the threshold end-point position error value at 745, the output joint velocity commands, $\theta_{com}$, are determined using the forward kinematics data, $K(\theta)$, as an input to a fourth function 760 (e.g., an inverse Jacobian function) as provided in an exemplary manner in EQNS. 17 and 18.

$$\dot{\theta}_{com} = J^{-1}(\dot{X}_d + K(X_d - X_c)) \qquad \text{EQN. 17}$$

where $$X_d = X_h + |\dot{X}_d|\Delta_t \begin{bmatrix} \cos\phi_d \\ \sin\phi_d \end{bmatrix} \qquad \text{EQN. 18}$$

In this instance, the home position and path time are not reset.

Figure 7:
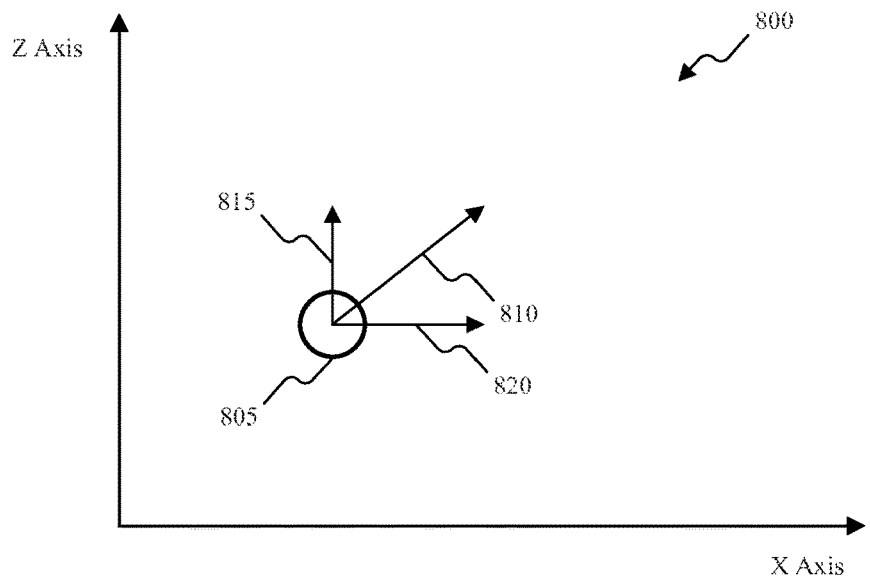
FIG. 7 illustrates a vector control system according to an embodiment of the invention.
Figure 8:
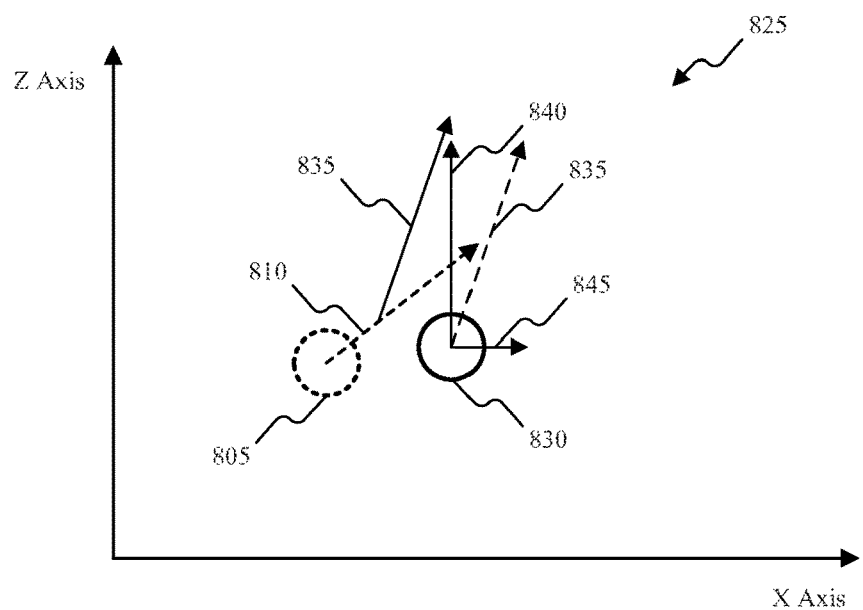
FIG. 8 illustrates vector control according to an embodiment of the invention.

The motion of the component of the industrial machine 10 according to the above-described control can be visualized with respect to the target vector and the updating of the target vector. For example, from the perspective of the component (e.g., dipper, etc.) or end-point of the industrial machine, the effect of a first operator input (at time step k−1) and a second operator input (at time step k) on the target vector of the industrial machine 10 is illustrated in FIGS. 7 and 8. The effect of only a first and a second operator input will be described with respect to FIGS. 7 and 8 for clarity and illustrative purposes. As shown in a diagram 800 in FIG. 7, a current position 805 of the end point of the industrial machine is affected by an operator input. The current end point of the industrial machine could be an initial position of the end point or a position following one or more operator inputs. The operator input has a corresponding target vector 810 that includes a component 815 in the Z direction and a component 820 in the X direction.

With respect to diagram 825 of FIG. 8, an updated operator input is received. However, the current position of the end point of the industrial machine has already moved to a new current position 830 as a result of the first operator input that was received. The updated operator input has a corresponding target vector 835 that includes a component 840 in the Z direction and a component 845 in the X direction. However, rather than controlling the motion of the end point of the industrial machine 10 from the new current position 830 along the updated target vector 835, the previous target vector 810 is updated using the updated target vector 835. Specifically, a position along the vector 810 corresponding to the movement of the end point along the vector since receiving the first operator input at position 805 is used as a starting point for the updated target vector 83 (solid line 835 rather than dashed line 835).

Thus, the invention provides, among other things, systems, methods, devices, and computer readable media for controlling a digging attachment of an industrial machine along a path or trajectory. Various features and advantages of the invention are set forth in the following claims.

What is claimed is:

1. A method of controlling a motion of a component of an industrial machine, the method comprising:
   receiving, from a user input device, a first signal corresponding to a first desired motion of the component;
   determining, with a controller, a first target vector based on the first signal;
   determining, with the controller, a first set of control signals based on the first target vector, the first set of control signals related to the first desired motion of the component;
   providing the first set of control signals to one or more actuators to control the component of the industrial machine based on the first target vector;
   receiving, from the user input device, a second signal corresponding to a second desired motion of the component;
   determining, with the controller, a second target vector based on the second signal;
   determining, with the controller, a second set of control signals based on the first target vector and the second target vector, the second set of control signals related to the second desired motion of the component, wherein the first target vector is updated using the second target vector and the updated first target vector is used to determine the second set of control signals; and
   providing the second set of control signals to the one or more actuators to control the component of the industrial machine based on the second target vector.

2. The method of claim 1, wherein the component of the industrial machine is a dipper.

3. The method of claim 1, wherein the industrial machine is an electric rope shovel.

4. The method of claim 1, wherein the first target vector is updated based on a change in direction between the first target vector and the second target vector.

5. The method of claim 4, wherein the second set of control signals is determined using an inverse Jacobian function.

6. The method of claim 5, wherein the inverse Jacobian function maps velocities for the one or more actuators to end-point velocities of the component.

7. The method of claim 1, wherein the first target vector is updated based on a change in magnitude between the first target vector and the second target vector.

8. The method of claim 1, wherein the first target vector is updated based on a position error between the first target vector and the second target vector.

9. The method of claim 1, wherein the second set of control signals map velocities for the one or more actuators to end-point velocities of the component.

10. An industrial machine comprising:
    a component;
    one or more actuators configured to control the component;
    a user input device configured to generate a first signal corresponding to a first desired motion of the component and a second signal corresponding to a second desired motion of the component; and
    a controller including a processor and a memory, the controller configured to
    receive the first signal;
    determine a first target vector based on the first signal;
    determine a first set of control signals based on the first target vector, the first set of control signals related to the first desired motion of the component;
    provide the first set of control signals to the one or more actuators to control the component of the industrial machine based on the first target vector;
    receive the second signal;
    determine a second target vector based on the second signal;
    determine a second set of control signals based on the first target vector and the second target vector, the second set of control signals related to the second desired motion of the component, wherein the first target vector is updated using the second target vector and the updated first target vector is used to determine the second set of control signals; and
    provide the second set of control signals to the one or more actuators to control the component of the industrial machine based on the second target vector.

11. The industrial machine of claim 10, wherein the component of the industrial machine is a dipper.

12. The industrial machine of claim 10, wherein the industrial machine is an electric rope shovel.

13. The industrial machine of claim 10, wherein the first target vector is updated based on a change in direction between the first target vector and the second target vector.

14. The industrial machine of claim 13, wherein the second set of control signals is determined using an inverse Jacobian function.

15. The industrial machine of claim 14, wherein the inverse Jacobian function maps velocities for the one or more actuators to end-point velocities of the component.

16. The industrial machine of claim 10, wherein the first target vector is updated based on a change in magnitude between the first target vector and the second target vector.

17. The industrial machine of claim 10, wherein the first target vector is updated based on a position error between the first target vector and the second target vector.

18. The industrial machine of claim 10, wherein the second set of control signals map velocities for the one or more actuators to end-point velocities of the component.

* * * * *